US011483094B2

(12) United States Patent
Ma et al.

(10) Patent No.: US 11,483,094 B2
(45) Date of Patent: Oct. 25, 2022

(54) METHOD FOR BLIND DETECTION, AND COMMUNICATION APPARATUS

(71) Applicant: HUAWEI TECHNOLOGIES CO., LTD., Guangdong (CN)

(72) Inventors: Ruixiang Ma, Beijing (CN); Yongxia Lyu, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/810,847

(22) Filed: Mar. 6, 2020

(65) Prior Publication Data

US 2020/0204294 A1    Jun. 25, 2020

Related U.S. Application Data

(63) Continuation of application No. PCT/CN2018/101892, filed on Aug. 23, 2018.

(30) Foreign Application Priority Data

Sep. 8, 2017    (CN) .......................... 201710808057.8

(51) Int. Cl.
    *H04L 1/00*     (2006.01)
    *H04W 72/04*     (2009.01)

(52) U.S. Cl.
    CPC .......... *H04L 1/0038* (2013.01); *H04L 1/0043* (2013.01); *H04W 72/042* (2013.01); *H04W 72/0446* (2013.01)

(58) Field of Classification Search
    CPC ... H04L 1/0038; H04L 1/0043; H04L 5/0053; H04L 5/0064; H04L 5/0094;

(Continued)

(56) References Cited

U.S. PATENT DOCUMENTS 9,204,432 B2   12/2015   Nishio et al.
10,292,179 B2 *  5/2019   Chaudhuri ............ H04L 1/1887
(Continued)

FOREIGN PATENT DOCUMENTS

CN    101883369 A    11/2010
CN    102014494 A    4/2011
(Continued)

OTHER PUBLICATIONS

Huawei et al,"UE procedure of PDCCH monitoring for URLLC",3GPP TSG RAN WG1 Meeting #89,R1-1708122, Hangzhou, China, May 15-19, 2017, total 3 pages.

(Continued)

*Primary Examiner* — Hoang-Chuong Q Vu
(74) *Attorney, Agent, or Firm* — Leydig, Voit & Mayer, Ltd.

(57) ABSTRACT

This application provides a communication method, a terminal device, and a network device, so that blind detection can be performed in different scheduling periods based on a maximum number of blind detection in a preset time period, thereby helping to reduce energy consumption that is caused to a terminal device by blind detection, and reduce blind detection complexity. The method includes: determining, by a terminal device, a maximum number of blind detection in a first time unit, where the first time unit is one or more symbols; and performing, by the terminal device, physical downlink control channel blind detection in the $i^{th}$ blind detection occasion, where the first time unit includes N blind detection occasions, and a number of physical downlink control channel blind detection performed by the terminal device in the N blind detection occasions is less than or equal to the maximum number of blind detection, where i and N are positive integers, $i \leq N$ and $N \geq 2$.

20 Claims, 5 Drawing Sheets

(58) Field of Classification Search
CPC ... H04L 1/0044; H04L 1/0079; H04L 5/0048; H04L 5/0057; H04W 72/042; H04W 72/0446; H04W 52/0229; Y02D 30/70
See application file for complete search history.

(56) References Cited

U.S. PATENT DOCUMENTS

| | | | | |
|---|---|---|---|---|
| 10,326,578 | B2* | 6/2019 | Wang | H04L 5/0053 |
| 2011/0310817 | A1* | 12/2011 | Okubo | H04L 5/0007 |
| | | | | 370/329 |
| 2012/0190395 | A1* | 7/2012 | Pan | H04L 5/0064 |
| | | | | 455/509 |
| 2013/0250874 | A1* | 9/2013 | Luo | H04W 72/042 |
| | | | | 370/329 |
| 2014/0092836 | A1* | 4/2014 | Park | H04W 72/042 |
| | | | | 370/329 |
| 2014/0119349 | A1* | 5/2014 | Takano | H04W 16/02 |
| | | | | 370/336 |
| 2014/0126484 | A1* | 5/2014 | Chen | H04L 5/0055 |
| | | | | 370/329 |
| 2014/0133331 | A1* | 5/2014 | Fu | H04W 48/16 |
| | | | | 370/252 |
| 2014/0133427 | A1* | 5/2014 | Kim | H04L 5/0053 |
| | | | | 370/329 |
| 2014/0254533 | A1* | 9/2014 | Kim | H04L 5/0023 |
| | | | | 370/329 |
| 2014/0328302 | A1* | 11/2014 | Park | H04W 72/042 |
| | | | | 370/329 |
| 2015/0195821 | A1* | 7/2015 | Li | H04L 5/0053 |
| | | | | 370/329 |
| 2016/0205614 | A1* | 7/2016 | Ma | H04W 48/12 |
| | | | | 370/329 |
| 2017/0019913 | A1* | 1/2017 | Ahn | H04W 72/10 |
| 2017/0223687 | A1* | 8/2017 | Kuchibhotla | H04L 5/0094 |
| 2017/0332397 | A1* | 11/2017 | Li | H04L 1/1887 |
| 2018/0191454 | A1* | 7/2018 | Furuskog | H04L 5/0053 |
| 2018/0234969 | A1* | 8/2018 | Wang | H04L 5/0053 |
| 2018/0254794 | A1* | 9/2018 | Lee | H04L 5/0064 |
| 2019/0037577 | A1* | 1/2019 | Sun | H04L 41/0866 |
| 2019/0069285 | A1* | 2/2019 | Chandrasekhar | H04B 7/0695 |
| 2019/0104520 | A1* | 4/2019 | Kim | H04L 5/0055 |
| 2019/0207796 | A1* | 7/2019 | Hwang | H04L 1/0045 |
| 2019/0223164 | A1* | 7/2019 | He | H04W 76/27 |
| 2019/0306847 | A1* | 10/2019 | Seo | H04L 5/0053 |
| 2019/0349915 | A1* | 11/2019 | Ahn | H04W 72/0413 |
| 2020/0119869 | A1* | 4/2020 | Taherzadeh Boroujeni | H04B 7/0695 |
| 2020/0177254 | A1* | 6/2020 | Lee | H04L 5/0051 |

FOREIGN PATENT DOCUMENTS

| | | |
|---|---|---|
| CN | 102255688 A | 11/2011 |
| CN | 103650447 A | 3/2014 |
| CN | 104219036 A | 12/2014 |
| CN | 106301674 A | 1/2017 |
| CN | 108365913 A | 8/2018 |
| JP | 2012529239 A | 11/2012 |
| JP | 2015534746 A | 12/2015 |
| RU | 2575391 C2 | 2/2016 |
| WO | 2016114560 A1 | 7/2016 |

OTHER PUBLICATIONS

Huawei et al.,"UE procedure of PDCCH monitoring for URLLC",3GPP TSG RAN WG1 Meeting #90,RI-1712209, Prague, Czech Republic, Aug. 21-25, 2017, total 3 pages.

3GPP TS 38.213 V1.0.0 (Sep. 2017),3rd Generation Partnership Project;Technical Specification Group Radio Access Network;NR;Physical layer procedures for control(Release 15), total 16 pages.

Ericsson,"On Blind Decoding of NR-PDCCH",3GPP TSG-RAN WG1 Meeting#89,R1-1709068,Hangzhou, China, May 15-19, 2017, total 3 pages.

Huawei et al,"Search space design",3GPP TSG RAN WG1 NR Ad Hoc Meeting,R1-1709952,Qingdao, China, Jun. 27-30, 2017, total 6 pages.

3GPP TS 38.214 V1.0.0 (Sep. 2017),3rd Generation Partnership Project;Technical Specification Group Radio Access Network;NR;Physical layer procedures for data (Release 15), total 32 pages.

Huawei et al,"Search space design",3GPP TSG RAN WGI Meeting #89,R1-1706944, Hangzhou, China, May 15-19, 2017, total 4 pages.

Catt,"Configuration aspects of the NR-PDCCH",3GPP TSG RAN WG1 NR Ad-Hoc#2,R1-1710076,Qingdao, P.R. China, Jun. 27-30, 2017, total 3 pages.

Intel Corporation ,"NR PDCCH: Search Spaces and monitoring behavior",3GPP TSG RAN WG1 NR Adhoc#2, R1-1710544,Qingdao, P.R. China, Jun. 20-23, 2017, total 11 pages.

Intel Corporation,"PDCCH search spaces and monitoring",3GPP TSG RAN WG1 #90,R1-1712569,Prague, P.R. Czechia, Aug. 21-25, 2017, total 11 pages.

3GPP TS 38.211 V0.2.2 (Sep. 2017),3rd Generation Partnership Project;Technical Specification Group Radio Access Network;NR;Physical channels and modulation(Release 15), total 40 pages.

3GPP TS 38.331 V0.0.5 (Aug. 2017),3rd Generation Partnership Project;Technical Specification Group Radio Access Network;NR;Radio Resource Control (RRC);Protocol specification(Release 15), total 38 pages.

LG Electronics, "Discussion on hierarchical search space structure", 3GPP TSG RAN WG1 #90, R1-1713167, total 12 pages, 3rd Generation Partnership Project, Valbonne, France (Aug. 25, 2017).

* cited by examiner

Slot 1   Slot 2

Slot 1   Slot 2   Slot 3   Slot 4

METHOD FOR BLIND DETECTION, AND COMMUNICATION APPARATUS

CROSS-REFERENCE TO RELATED APPLICATIONS

This application is a continuation of International Patent Application No. PCT/CN2018/101892, filed on Aug. 23, 2018, which claims priority to Chinese Patent Application No. 201710808057.8, filed on Sep. 8, 2017. The disclosures of the aforementioned applications are hereby incorporated by reference in their entireties.

TECHNICAL FIELD

This application relates to the communications field, and more specifically, to a communication method, a terminal device, and a network device.

BACKGROUND

Downlink control information (DCI) is carried by a physical downlink control channel (PDCCH), and may be used to carry resource configuration information of a terminal device and other control information. Because a plurality of PDCCHs sent to a plurality of terminal devices may be transmitted in one scheduling period, a terminal device needs to receive (to be specific, blindly detect or blindly decode), from the plurality of PDCCHs, a PDCCH sent to the terminal device, to obtain DCI. The terminal device demodulates, based on an indication of the DCI, at a corresponding resource location, a physical downlink shared channel (PDSCH) that belongs to the terminal device.

In long term evolution (LTE) systems, a subframe is used as a scheduling period for sending PDCCHs, so as to perform resource scheduling. A maximum number of blind detection by a terminal device in one subframe is defined in LTE. Such maximum number may be 44, for example. In other words, in one subframe, the terminal device may perform a maximum number of 44 blind detections. Also, in LTE, a scheduling period is the same as a blind detection period.

However, using one subframe as a time length of a scheduling period may fail to meet requirements of some services, such as ultra-reliable and low latency communications (URLLC), which has a relatively high requirement on latency. Therefore, it is desired that the scheduling period can be flexibly adjusted based on a service type, to perform resource scheduling for a terminal device. For example, scheduling may be performed by using a slot as a scheduling period, or using a symbol as a scheduling period.

On the other hand, if blind detection is performed in all scheduling periods based on a same maximum number of blind detection, for a terminal device that has a relatively short scheduling period (for example, a mini-slot), the number of blind detection performed by the terminal device in one slot may be multiplied. This greatly increases energy consumption caused by blind detection of the terminal device, and may increase blind detection complexity of the terminal device.

SUMMARY

This application provides a communication method, a terminal device, and a network device, so that blind detection can be performed in different scheduling periods based on a maximum number of blind detection in a preset time period, thereby helping to reduce energy consumption that is caused to a terminal device by blind detection, and reduce blind detection complexity of the terminal device.

According to a first aspect, a communication method is provided. The method includes: determining, by a terminal device, a maximum number of blind detection in a first time unit, where the first time unit is one or more symbols; and performing, by the terminal device, physical downlink control channel blind detection in the $i^{th}$ blind detection occasion, where the first time unit includes N blind detection occasions, and a number of physical downlink control channel blind detection performed by the terminal device in the N blind detection occasions is less than or equal to the maximum number of blind detection, where i and N are positive integers, i≤N, and N≥2.

According to the foregoing technical solution, the terminal device may perform blind detection in a plurality of blind detection occasions based on the maximum number of blind detection in the first time unit, so that blind detection can be performed in different scheduling periods based on the same maximum number of blind detection. Further, when a network device sends a plurality of physical downlink control channels to the terminal device, the terminal device does not need to perform blind detection separately based on different scheduling periods. This helps to reduce energy consumption that is caused to the terminal device by blind detection, and reduce blind detection complexity of the terminal device.

Optionally, the first time unit is one slot.

With reference to the first aspect, in some implementations of the first aspect, the method further includes: receiving, by the terminal device, configuration information, where the configuration information is used to determine a number of blind detection in each blind detection occasion in the first time unit.

The terminal device may determine the number of blind detection in each of the N blind detection occasions in the first time unit based on the configuration information, to perform physical downlink control channel blind detection successively in the N blind detection occasions based on the number of blind detection.

The number of blind detection in each blind detection occasion may be determined based on an aggregation level that is configured by the network device and that is corresponding to each downlink control information format, and a quantity of candidate physical downlink control channels at each aggregation level, or may be determined by the terminal device based on the maximum number of blind detection and a quantity of blind detection occasions in the first time unit.

With reference to the first aspect, in some implementations of the first aspect, the performing, by the terminal device, physical downlink control channel blind detection in the $i^{th}$ blind detection occasion includes: performing, by the terminal device, physical downlink control channel blind detection in the $i^{th}$ blind detection occasion based on first information, where the first information includes at least one of the following: configuration information for a control resource set, a search space type, a format of downlink control information, an aggregation level corresponding to the downlink control information, and serial numbers of start control channel elements of a plurality of candidate physical downlink control channels at a same aggregation level.

It should be understood that, the first information may be obtained from the configuration information, or may be predefined. This is not limited in this application.

Further, the terminal device may perform blind detection in the $i^{th}$ blind detection occasion based on at least one of the foregoing factors. In this way, an order in which the terminal device performs blind detection can be determined from different perspectives based on different factors, to be applicable to different scenarios.

Optionally, the first information includes the configuration information for a control resource set, and a plurality of control resource sets are distributed in the $i^{th}$ blind detection occasion; and the performing, by the terminal device, physical downlink control channel blind detection in the $i^{th}$ blind detection occasion based on configuration information for a physical downlink control channel includes: performing, by the terminal device, physical downlink control channel blind detection successively on the plurality of control resource sets based on a descending order of priorities of the plurality of control resource sets in the $i^{th}$ blind detection occasion.

Optionally, the first information includes the search space type, and the performing, by the terminal device, physical downlink control channel blind detection in the $i^{th}$ blind detection occasion based on first information includes: performing, by the terminal device, physical downlink control channel blind detection successively in a plurality of search spaces based on a priority order of search space types in the $i^{th}$ blind detection occasion, where the search space types include a common search space and a user-specific search space.

Optionally, the first information includes the format of the downlink control information, and there are a plurality of downlink control information formats in the $i^{th}$ blind detection occasion; and the performing, by the terminal device, physical downlink control channel blind detection in the $i^{th}$ blind detection occasion based on first information includes: successively performing, by the terminal device, physical downlink control channel blind detection in the $i^{th}$ blind detection occasion based on a priority order of the plurality of downlink control information formats.

Optionally, the first information includes the aggregation level, and there are a plurality of aggregation levels corresponding to downlink control information that waits to be blindly detected in the $i^{th}$ blind detection occasion; and the performing, by the terminal device, physical downlink control channel blind detection in the $i^{th}$ blind detection occasion based on first information includes: performing, by the terminal device, physical downlink control channel blind detection in the $i^{th}$ blind detection occasion based on an ascending order or a descending order of the aggregation levels.

Optionally, the first information includes the serial numbers of the start control channel elements of the candidate physical downlink control channels, and there are a plurality of candidate physical downlink control channels at a same aggregation level corresponding to downlink control information that waits to be blindly detected in the $i^{th}$ blind detection occasion; and the performing, by the terminal device, physical downlink control channel blind detection in the $i^{th}$ blind detection occasion based on first information includes: performing, by the terminal device, physical downlink control channel blind detection in the $i^{th}$ blind detection occasion based on a descending order or an ascending order of serial numbers of the start control channel elements of the plurality of candidate physical downlink control channels at the same aggregation level.

Therefore, the network device may send at least one physical downlink control channel in the plurality of blind detection occasions according to any one or more of the foregoing rules, and the terminal device may perform blind detection according to the one or more of the foregoing rules. When the network device and the terminal device respectively send a physical downlink control channel and perform blind detection according to a same rule, the terminal device can detect, within a limitation of the maximum number of blind detection, the physical downlink control channel sent by the network device. This can not only avoid a detection omission of the terminal device, but also reduce energy consumption caused by blind detection of the terminal device and reduce blind detection complexity.

According to a second aspect, a communication method is provided. The method includes: sending, by a network device, configuration information, where the configuration information is used to indicate a number of blind detection in each of N blind detection occasions in a first time unit, the first time unit is one or more symbols, the first time unit includes the N blind detection occasions, N is a positive integer, and N≥2; and sending, by the network device, at least one physical downlink control channel in the $i^{th}$ blind detection occasion, where i is a positive integer, and i≤N.

According to the foregoing technical solution, the network device sends the configuration information to a terminal device, so that the terminal device determines the number of blind detection in each of the N blind detection occasions in the first time unit, to perform blind detection in the N blind detection occasions. Therefore, the terminal device can perform blind detection in different scheduling periods based on a same maximum number of blind detection. Further, when the network device sends a plurality of physical downlink control channels to the terminal device, the terminal device does not need to perform blind detection separately based on different scheduling periods. This helps to reduce energy consumption that is caused to the terminal device by blind detection, and reduce blind detection complexity of the terminal device.

Optionally, the first time unit is one slot.

With reference to the second aspect, in some implementations of the second aspect, the sending, by the network device, at least one physical downlink control channel in the $i^{th}$ blind detection occasion includes: sending, by the network device, the at least one physical downlink control channel in the $i^{th}$ blind detection occasion based on first information, where the first information includes at least one of the following: configuration information for a control resource set, a search space type, a format of downlink control information, an aggregation level corresponding to the downlink control information, and serial numbers of start control channel elements of a plurality of candidate physical downlink control channels at a same aggregation level.

Optionally, the first information includes the configuration information for a control resource set, and a plurality of control resource sets are distributed in the $i^{th}$ blind detection occasion; and the sending, by the network device, at least one physical downlink control channel in the $i^{th}$ blind detection occasion includes: selecting, by the network device, an available control resource set in the $i^{th}$ blind detection occasion based on a descending order of priorities of the plurality of control resource sets, and sending the at least one physical downlink control channel by using the available control resource set.

The network device may send the at least one physical downlink control channel in the N blind detection occasions based on at least one of the foregoing factors. In this way, a sending order of physical downlink control channels can be determined from different perspectives based on different factors, to be applicable to different scenarios.

Optionally, the first information includes the search space type, and the sending, by the network device, at least one physical downlink control channel in the $i^{th}$ blind detection occasion includes: selecting, by the network device, an available search space in the $i^{th}$ blind detection occasion based on a priority order of search space types, and sending the at least one physical downlink control channel by using the available search space.

Optionally, the first information includes the format of the downlink control information, and a plurality of downlink control information formats need to be sent in the $i^{th}$ blind detection occasion; and the sending, by the network device, at least one physical downlink control channel in the $i^{th}$ blind detection occasion includes: successively sending, by the network device, the at least one physical downlink control channel in the $i^{th}$ blind detection occasion based on a priority order of the plurality of downlink control information formats.

Optionally, the first information includes the aggregation level, and a plurality of aggregation levels are configured for a same downlink control information format in the $i^{th}$ blind detection occasion; and the sending, by the network device, at least one physical downlink control channel in the $i^{th}$ blind detection occasion includes: selecting, by the network device, an available aggregation level based on a descending order or an ascending order of the plurality of aggregation levels corresponding to the same downlink control information format in the $i^{th}$ blind detection occasion, and sending the at least one physical downlink control channel by using the available aggregation level.

Optionally, the first information includes the serial numbers of the start control channel elements of the plurality of candidate physical downlink control channels at the same aggregation level, and there are a plurality of candidate physical downlink control channels at a same aggregation level corresponding to downlink control information that waits to be blindly detected in the $i^{th}$ blind detection occasion; and the sending, by the network device, at least one physical downlink control channel in the $i^{th}$ blind detection occasion includes: determining, by the network device, an available candidate physical downlink control channel based on an ascending order or a descending order of serial numbers of the start control channel elements of the plurality of candidate physical downlink control channels, and sending the at least one physical downlink control channel by using the available candidate physical downlink control channel.

Therefore, the network device may send the at least one physical downlink control channel in the plurality of blind detection occasions according to any one or more of the foregoing rules, and the terminal device may perform blind detection according to the one or more of the foregoing rules. When the network device and the terminal device respectively send a physical downlink control channel and perform blind detection according to a same rule, the terminal device can detect, within a limitation of the maximum number of blind detection, the physical downlink control channel sent by the network device. This can not only avoid a detection omission of the terminal device, but also reduce energy consumption caused by blind detection of the terminal device and reduce blind detection complexity.

According to a third aspect, a terminal device is provided. The terminal device has functions for implementing the terminal device in the method design of the first aspect. These functions may be implemented by using hardware, or may be implemented by executing corresponding software by hardware. The hardware or software includes one or more units corresponding to the functions.

According to a fourth aspect, a network device is provided. The network device has functions for implementing the network device in the method design of the second aspect. These functions may be implemented by using hardware, or may be implemented by executing corresponding software by hardware. The hardware or software includes one or more units corresponding to the functions.

According to a fifth aspect, a terminal device is provided. The terminal device includes a transceiver, a processor, and a memory. The processor is configured to control the transceiver to send and receive a signal, the memory is configured to store a computer program, and the processor is configured to invoke the computer program from the memory and run the computer program, so that the terminal device performs the method in the first aspect.

According to a sixth aspect, a network device is provided. The network device includes a transceiver, a processor, and a memory. The processor is configured to control the transceiver to send and receive a signal, the memory is configured to store a computer program, and the processor is configured to invoke the computer program from the memory and run the computer program, so that the network device performs the method in the second aspect.

According to a seventh aspect, a communications apparatus is provided. The communications apparatus may be the terminal device in the foregoing method design, or a chip disposed in the terminal device. The communications apparatus includes: a memory, configured to store computer executable program code; a communications interface; and a processor. The processor is coupled to the memory and the communications interface. The program code stored in the memory includes an instruction. When the processor executes the instruction, the communications apparatus is enabled to perform the method that is performed by the terminal device in any one of the first aspect or the possible designs of the first aspect.

According to an eighth aspect, a communications apparatus is provided. The communications apparatus may be the network device in the foregoing method design, or a chip disposed in the network device. The communications apparatus includes: a memory, configured to store computer executable program code; a communications interface; and a processor. The processor is coupled to the memory and the communications interface. The program code stored in the memory includes an instruction. When the processor executes the instruction, the communications apparatus is enabled to perform the method that is performed by the network device in any one of the second aspect or the possible designs of the second aspect.

According to a ninth aspect, a computer program product is provided. The computer program product includes computer program code. When the computer program code is run on a computer, the computer is enabled to perform the methods in the foregoing aspects.

According to a tenth aspect, a computer readable medium is provided. The computer readable medium stores computer program code. When the computer program code is run on a computer, the computer is enabled to perform the methods in the foregoing aspects.

According to an eleventh aspect, a chip is provided. The chip includes a processor and a memory. The memory is configured to store a computer program, and the processor is configured to invoke the computer program from the memory and run the computer program, where the computer program is used to implement the methods in the foregoing aspects.

In some possible implementations, the configuration information includes at least one of the following: at least one downlink control information DCI format in each blind detection occasion, an aggregation level corresponding to each DCI format, a quantity of a plurality of candidate physical downlink control channels at a same aggregation level, a quantity N of the blind detection occasions in the first time unit, and the total number of blind detection in each blind detection occasion.

In some possible implementations, the control resource sets are periodically distributed in one slot, and control resource sets in any two slots have same start locations and same duration.

In some possible implementations, the control resource sets are periodically distributed in one slot, and control resource sets in at least two slots have different start locations and/or different duration.

In some possible implementations, one control resource set is in one slot. In other words, one control resource set does not span two slots.

In some possible implementations, a priority of the common search space is higher than a priority of the user-specific search space.

DESCRIPTION OF EMBODIMENTS

The following describes technical solutions of this application with reference to accompanying drawings.

The technical solutions in embodiments of this application may be applied to various communications systems, such as global system for mobile communications (GSM) system, code division multiple access (CDMA) system, wideband code division multiple access (WCDMA) system, general packet radio service (GPRS) system, long term evolution (LTE) system, LTE frequency division duplex (FDD) system, LTE time division duplex (TDD) system, universal mobile telecommunication system (UMTS), worldwide interoperability for microwave access (WiMAX) communications system, and fifth generation (5G) communication systems or new radio (NR) systems that are in development.

Figure 1:
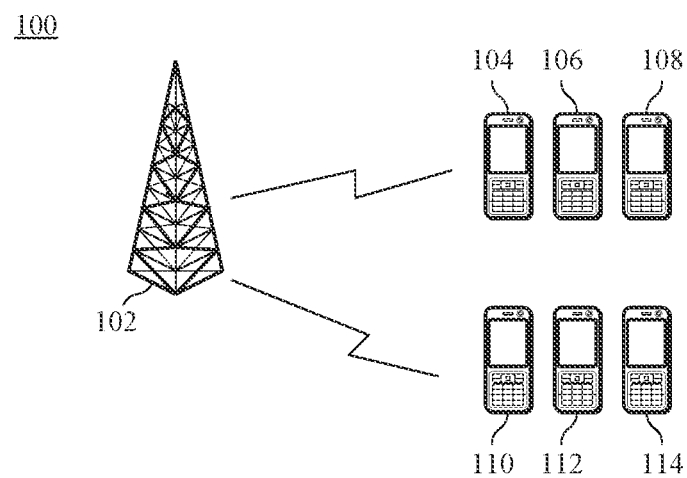
FIG. 1 is a schematic diagram of a communications system in which a communication method according to embodiments of this application can be performed.

For ease of understanding of the embodiments of this application, a communications system to which the embodiments of this application are applicable is first described in detail with reference to FIG. 1. FIG. 1 is a schematic diagram of a communications system 100 to which a reference signal sending and receiving method in an embodiment of this application is applicable. As shown in FIG. 1, the communications system 100 may include a network device 102 and terminal devices 104 to 114.

It should be understood that, the network device 102 may be any communication device that has wireless sending/receiving and processing functionalities, or a component of such device that provides the above functionalities, such as a set of microchips. Examples of the network device 102 include, and not limited to: a base station (such as a NodeB (NodeB), an evolved NodeB (eNodeB)), or a network device (such as a transmission point (TP), a transmission reception point (TRP), a base station, or a small cell device) in a 5th generation (5G) communications system); a network device in a future communications system; an access node, a wireless relay node, or a wireless backhaul node in a wireless fidelity (Wi-Fi) system; and the like.

The network device 102 may communicate with a plurality of terminal devices (for example, the terminal devices 104 to 114 shown in the figure).

It should be understood that the terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer, a computer having a wireless sending and receiving function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, and the like. An application scenario is not limited in the embodiments of this application. In this application, the foregoing terminal devices and chips that can be disposed in the foregoing terminal devices are collectively referred to as terminal devices.

In addition, the communications system 100 may be alternatively a public land mobile network (PLMN), a device-to-device (D2D) network, a machine-to-machine (M2M) network, or another network.

It should be understood that, FIG. 1 shows one network device and a plurality of terminals as an example. The wireless communications system 100 may include a plurality of network devices, and there may be another quantity of terminals in a coverage area of each network device. This is not limited in the embodiments of this application.

For ease of understanding of the embodiments of this application, the following first briefly describes several concepts in the embodiments of this application.

1. Resource element (RE): A resource element is a smallest resource unit, may be corresponding to one symbol in time domain, and may be corresponding to one subcarrier in frequency domain.

2. Resource block (RB): One RB occupies $N_{sc}^{RB}$ consecutive subcarriers in frequency domain, where $N_{sc}^{RB}$ is a positive integer. For example, $N_{sc}^{RB}$ is 12 in an LTE protocol. In the embodiments of this application, an RB may be defined only from a perspective of a frequency domain resource. In other words, a quantity of time domain resources occupied by an RB in time domain is not limited.

3. Symbol: A symbol is a smallest unit of a time domain resource. A time length of one symbol is not limited in the embodiments of this application. A length of one symbol may vary depending on different subcarrier spacings. Symbols may include an uplink symbol and a downlink symbol. As an example rather than a limitation, the uplink symbol may be referred to as a single carrier frequency division multiple access (SC-FDMA) symbol or an orthogonal frequency division multiple (OFDM) access symbol, and the downlink symbol may be referred to as an OFDM symbol.

4. Control channel: A control channel is a channel that can be used to carry resource scheduling information and other control information. For example, the control channel may be a PDCCH or an enhanced physical downlink control channel (enhanced PDCCH, EPDCCH) defined in the LTE protocol, may be a new radio physical downlink control channel (new radio PDCCH, NRPDCCH) or another downlink channel that has the foregoing function and that is defined with network evolution, or may be an uplink control channel, such as a physical uplink control channel (PUCCH). For ease of description, a control channel transmission method in an embodiment of this application is described below in detail by using the physical downlink control channel as an example. It should be understood that, the physical downlink control channel may be understood as a general term of downlink control channels, and may include but is not limited to the downlink control channels listed above. It should be further understood that, a channel may also be referred to as a signal or another name. This is not specifically limited in the embodiments of the present application.

Specifically, the physical downlink control channel in the embodiments of this application may be alternatively a physical downlink control channel based on a cell-specific reference signal (CRS), or a physical downlink control channel based on a demodulation reference signal (DMRS). The CRS-based physical downlink control channel may be a physical downlink control channel demodulated based on a CRS, and the DMRS-based physical downlink control channel may be a physical downlink control channel demodulated based on a DMRS. The CRS is a reference signal (RS) configured by a network device for all terminal devices in a cell. The DMRS is an RS configured by a network device for a specific terminal device, or may be referred to as a UE-specific reference signal (URS).

It should be noted that, a physical downlink control channel defined in an NR system may be the DMRS-based physical downlink control channel.

5. Aggregation level (AL): An aggregation level may indicate a quantity of consecutive control channel elements (CCEs) occupied by one physical downlink control channel. To be specific, an aggregation level of a physical downlink control channel is L if the downlink control channel is formed by aggregating L CCEs, or in other words, the downlink control channel can be transmitted on L consecutive CCEs, where L is a positive integer. Specifically, a value of L may be 1, 2, 4, or 8, or may further be 16 or 32. A value of the aggregation level is not specifically limited in the embodiments of the present application.

6. Resource element group (REG) and control channel element (CCE): A resource element group and a control channel element are basic units for physical-resource allocation for downlink control signaling, and are used to define a mapping from the downlink control signaling to an RE. For example, it is specified in the LTE protocol that, one CCE includes nine REGs, and one REG includes four non-reference signal (reference signal, RS) REs that are consecutive in frequency domain. In other words, one CCE includes 36 REs. It should be understood that, the REG and the CCE are merely units used for resource allocation, and shall not constitute any limitation on this application. This application does not exclude a possibility of defining a new resource allocation unit in a future protocol to implement a same or similar function.

7. Search space: A search space is used as a search range of blind detection of a terminal device. The concept of search space is defined in an existing protocol (for example, the LTE protocol). The search space is a set of candidate downlink control channels that need to be monitored by the terminal device. The search space may include a common search space and a UE-specific search space. The common search space is used to transmit cell-level common information, which may include, for example, control information related to paging, a random access response (RAR), and a broadcast control channel (BCCH). The UE-specific search space is used to transmit terminal device (or UE)-level information, which may include, for example, control information related to a downlink shared channel (DL-SCH) and an uplink shared channel (UL-SCH).

8. Control resource set (CORESET): A control resource set is a set of resources used to transmit downlink control information, and may also be referred to as a control resource area or a physical downlink control channel resource set.

A control channel may be divided into a plurality of control resource sets, and each control resource set is a set of REGs. The terminal device may monitor a physical downlink control channel on one or more control resource sets.

For the network device, the control resource set may be understood as a set of resources that may be occupied for sending a control channel. For the terminal device, search spaces of physical downlink control channels of all terminal devices belong to the control resource set. In other words, the network device may determine, from the control resource set, a resource used for sending a physical downlink control channel, and the terminal device may determine a search space of a physical downlink control channel from the control resource set. The control resource set may include time-frequency resources, for example, may be a segment of bandwidth or one or more subbands in frequency domain, and may be one or more time units in time domain. One CORESET may be consecutive or non-consecutive resource units in time domain or frequency domain, for example, consecutive resource blocks (RBs) or non-consecutive RBs.

It should be understood that, the CORESET described above is an example of the control resource set, and shall not constitute any limitation on this application. This application does not exclude a possibility of replacing the CORESET with another name in a future protocol to implement a same or similar function.

It should be further understood that, specific content of the frequency domain resource, the time domain resource, and the time-frequency resource illustrated above is merely used for example description, and shall not constitute any limitation on the embodiments of the present application. For example, the RB is an example of the resource unit. A size of the RB may be defined in an existing LTE protocol or may be defined in a future protocol, or the RB may be replaced with another name. For another example, a time unit may be a subframe, may be a slot (slot), may be a radio frame, a mini-slot (or sub-slot), a plurality of aggregated slots, a plurality of aggregated subframes, or a symbol, or may even be a transmission time interval (TTI). This is not specifically limited in the embodiments of this application.

The following describes the embodiments of this application in detail with reference to the accompanying drawings.

It should be understood that, the technical solutions of this application may be applied to a wireless communications system, for example, the communications system 100 shown in FIG. 1. The communications system may include at least one network device and at least one terminal device. The network device may communicate with the terminal device through a wireless air interface. For example, the network device in the communications system may be corresponding to the network device 102 shown in FIG. 1, and the terminal device in the communications system may be corresponding to the terminal devices 104 to 114 shown in FIG. 1.

Without loss of generality, the following describes the embodiments of this application in detail by using an interaction process between one terminal device and a network device as an example. The terminal device may be any terminal device that is in the wireless communications system and that has a wireless connection relationship with the network device. It can be understood that, the network device and a plurality of terminal devices that are in the wireless communications system and that have a wireless connection relationship may perform transmission of reference signals according to the same technical solutions. This is not limited in this application.

Figure 2:
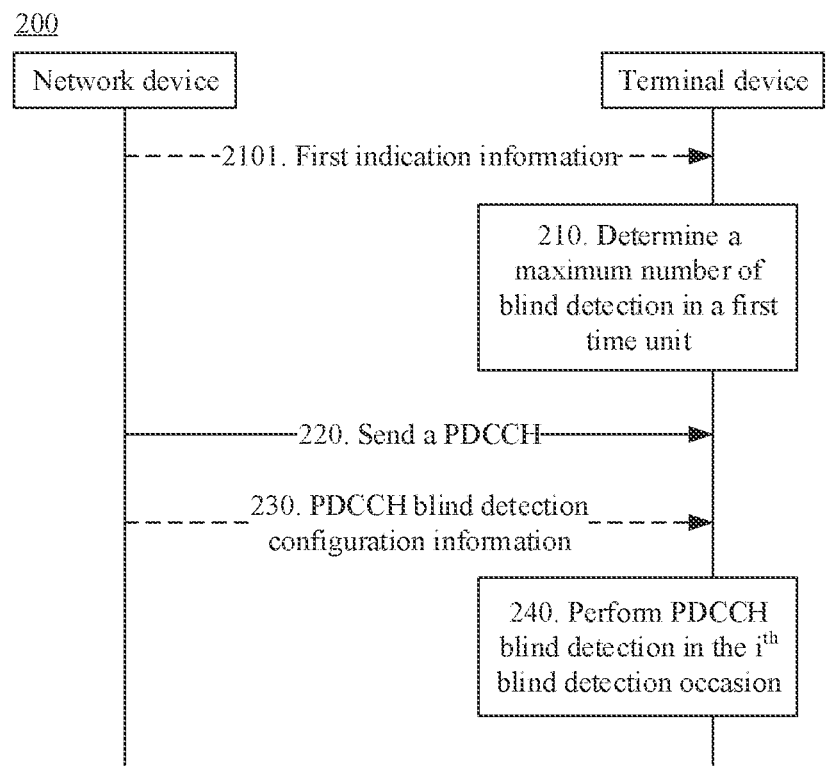
FIG. 2 is a flow diagram of a communication method according to an embodiment of this application.

FIG. 2 is a schematic flowchart of a communication method 200 according to an embodiment of this application from the perspective of device interaction. As shown in FIG. 2, the method 200 includes step 210 to step 240.

Step 210: A terminal device determines a maximum number of blind detection in a first time unit.

The maximum number of blind detection may be used to indicate a maximum number of blind detection that the terminal device is capable of performing in the first time unit. Alternatively, the first time unit is corresponding to the maximum number of blind detection, and in step 210, the terminal device determines the maximum number of blind detection that is corresponding to the first time unit. Herein, the first time unit may be a predefined (for example, protocol-defined) time length. The first time unit may include one or more symbols. For example, the first time unit may be one slot, or the first time unit may be k (k is a positive integer) symbols, and a time length of the k symbols is less than one slot. If a slot definition in an LTE protocol is still used, k is, for example, less than 14 with a normal cyclic prefix. Optionally, the maximum number of blind detection may be predefined.

For example, the maximum number of blind detection may be defined in a protocol. The maximum number of blind detection of the terminal device may be fixed in the protocol, or different maximum numbers of blind detection are defined based on different service types. This is not limited in this application.

Optionally, the maximum number of blind detection may be reported by a user equipment.

For example, the user equipment reports, to a network device based on a capability of the user equipment, the maximum number of blind detection performed in the first time unit.

Optionally, the maximum number of blind detection is indicated by the network device.

In this case, the method 200 further includes step 2101: The terminal device receives first indication information sent by the network device, where the first indication information is used to indicate the maximum number of blind detection.

Correspondingly, in step 2101, the network device sends the first indication information, where the first indication information is used to indicate the maximum number of blind detection.

Specifically, the maximum number of blind detection of the terminal device may be determined based on a control resource usage status and a capability of the terminal device. In a possible implementation, the terminal device may report, to the network device, an initial maximum number of blind detection (for ease of differentiation, a maximum number of blind detection that is corresponding to the capability of the terminal device is referred to as the initial maximum number of blind detection) that can represent the capability of the terminal device, and the network device may determine the maximum number of blind detection of the terminal device based on the initial maximum number of blind detection of the terminal device, a network resource usage status, and the like, and indicate the maximum number of blind detection to the terminal device by using signaling.

Optionally, the method 200 further includes: reporting, by the terminal device, the initial maximum number of blind detection performed in the first time unit. Alternatively, the terminal device reports the initial maximum number of blind detection that is corresponding to the first time unit.

For example, the terminal device may report, to the network device based on the capability of the terminal device, the initial maximum number of blind detection performed in the first time unit. The initial maximum number of blind detection may be greater than or equal to the maximum number of blind detection.

Step 220: The network device sends at least one physical downlink control channel in the first time unit.

Specifically, the network device may send one or more physical downlink control channels to a same terminal device in the first time unit. In other words, the network device may send downlink control information (DCI) in one or more formats to a same terminal device in the first time unit. For different formats of downlink control information, blind detection periods of corresponding physical downlink control channels are different. For example, a blind detection period of a physical downlink control channel 1 may be one slot, and a blind detection period of a physical downlink control channel 2 may be three symbols. Therefore, for downlink control information in different formats, blind detection periods included in a same first time unit are different. Further, a blind detection period of downlink control information in each format may be configured for the terminal device by using higher layer signaling.

Figure 3:
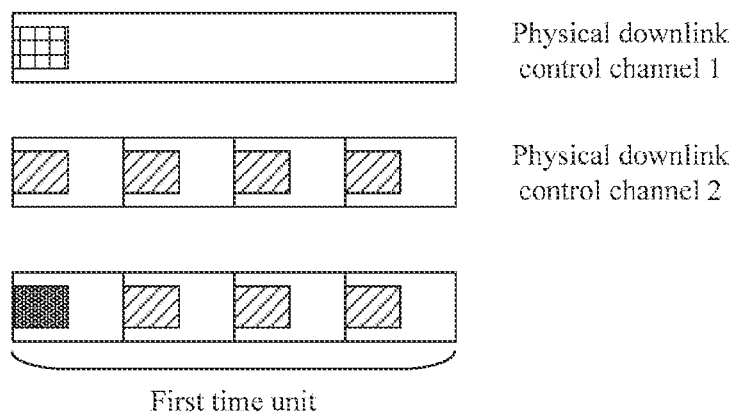
FIG. 3 is a schematic diagram of a blind detection period.

FIG. 3 is a schematic diagram of a blind detection period. FIG. 3 is a schematic diagram of sending physical downlink control channels in two downlink control information formats on a control resource set (for example, a CORESET). A blind detection period of a physical downlink control channel 1 may be one slot, and a blind detection period of a physical downlink control channel 2 may be m (m≥1, and m is an integer) symbols, for example, m=3.

It should be noted that, resources in the control resource set may be defined according to a protocol. In other words, resource locations in the control resource set may be predetermined and fixed. If the network device is willing to send a physical downlink control channel, the network device first selects a control resource set, and sends the physical downlink control channel on the selected control resource set.

Actually, two slots shown in FIG. 3 overlap in time domain. The two slots corresponding to the two physical downlink control channels are separately drawn in the figure only for ease of description and understanding. The two physical downlink control channels may be sent on different control resource sets. In other words, in two figures in an upper part of FIG. 3, there are two control resource sets in the first leftmost column, the physical downlink control channel 1 may be sent on the first control resource set, the physical downlink control channel 2 is sent on the second control resource set, wherein the first control resource set and the second control resource set are in an order from the top down in FIG. 3, and only the physical downlink control channel 2 may be sent on three remaining control resource sets. Similarly, the two physical downlink control channels may be sent on a same control resource set. If the two slots corresponding to the physical downlink control channel 1 and the physical downlink control channel 2 are drawn in an overlapping manner, a figure shown on the bottom of FIG. 3 can be obtained. In other words, the physical downlink control channel 1 and the physical downlink control channel 2 may be sent on the first leftmost control resource set, and only the physical downlink control channel 2 may be sent on the three remaining control resource sets.

In this embodiment of this application, two or more blind detection periods that overlap in time domain may be referred to as one blind detection occasion (blind detection occasion). Therefore, if a first time unit shown in FIG. 3 is one slot, the first time unit may include four blind detection occasions.

In other words, the first time unit includes N (N is a positive integer, and N≥2) blind detection occasions, and the N blind detection occasions may be determined based on a blind detection period of each of a plurality of physical downlink control channels. In other words, the first time unit is corresponding to the N blind detection occasions, where N is a positive integer, and N≥2.

The terminal device may perform physical downlink control channel blind detection successively on corresponding control resource sets in all the blind detection occasions based on a chronological order of the plurality of blind detection occasions.

It should be noted that the control resource set is a set of resources used to carry a physical downlink control channel. In this embodiment of this application, the control resource set may be periodic only in a slot, but does not span a boundary of the slot. A plurality of control resource sets may be periodically configured in one slot, and the plurality of control resource sets may have same duration and same periods. However, CORESETs configured in any two slots may have different start locations and different periods, or may have same start locations and same periods.

Figure 4:
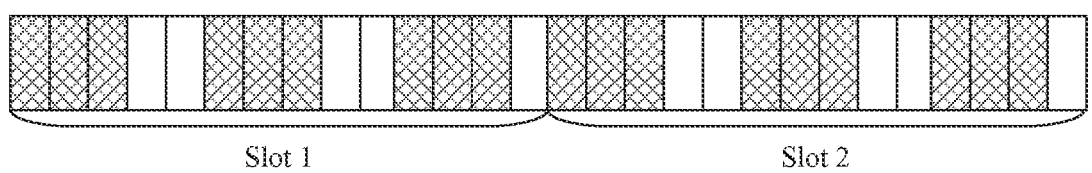
FIG. 4 is a schematic diagram of a control resource set configuration.
Figure 5:
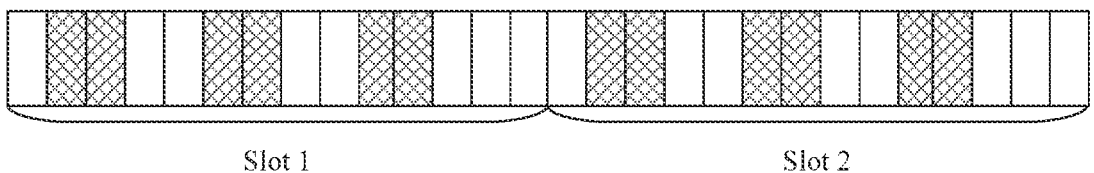
FIG. 5 is another schematic diagram of a control resource set configuration.
Figure 6:
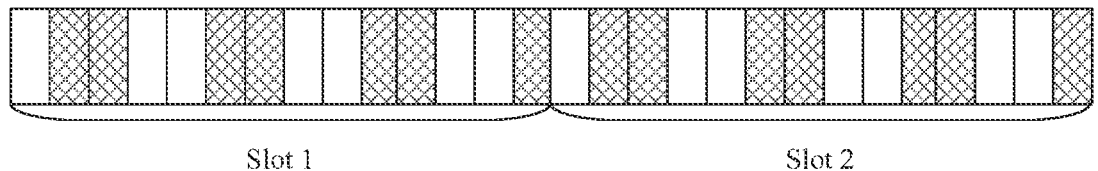
FIG. 6 is still another schematic diagram of a control resource set configuration.

For ease of understanding, FIG. 4 to FIG. 6 are schematic diagrams of control resource set configurations.

As shown in FIG. 4, in 14 symbols included in each slot (for example, a slot 1 and a slot 2), a start location of a control resource set is the zeroth symbol in the slot, duration of the control resource set is three symbols, and one control resource set period is five symbols. In other words, control resource sets occur at intervals of two symbols. 14 symbols cannot be equally allocated to control resource set periods, each of which includes five symbols. Therefore, an interval between the last control resource set in the slot 1 and the first control resource set in the slot 2 is not necessarily equal to an interval between two control resource sets in one slot.

As shown in FIG. 5, in the first slot (namely, a slot 1), a start location of a control resource set is the first symbol in the slot, duration of the control resource set is two symbols, and one control resource set period is four symbols. In other words, control resource sets occur at intervals of two symbols. There are three remaining symbols after the last control resource set in a current slot (for example, the slot 1), and the three remaining symbols are not enough for one control resource set period. Therefore, no control resource set is configured on the three symbols. In a next slot (namely, a slot 2), control resource set configuration still starts from the first symbol. In other words, a start location of a control resource set is the same relative to a location of a start boundary of the slot.

It can be learned from FIG. 4 and FIG. 5 that, control resource sets are periodically distributed in one slot, and control resource sets in any two slots have same start locations and same duration.

As shown in FIG. 6, in the first slot (namely, a slot 1), a start location of a control resource set is the first symbol in the slot, duration of the control resource set is two symbols, and one control resource set period is four symbols. In other words, control resource sets occur at intervals of two symbols. There are three remaining symbols after the last control resource set in a current slot (for example, the slot 1), and the three remaining symbols are not enough for one control resource set period. Therefore, a one-symbol control resource set is configured on the last symbol of the three symbols, to ensure that the control resource set does not span a boundary of the slot. In other words, one CORESET does not span two slots. In a next slot (namely, a slot 2), control resource set configuration still starts from the first symbol. In other words, a start location of a control resource set is the same relative to a location of a start boundary of the slot.

When a plurality of control resource sets are configured in a plurality of slots, alternatively, start locations and duration of the control resource sets in the slots may be separately configured. For example, in a slot group 1 including at least one slot, control resource sets in the slot have same start locations and same duration, and in a slot group 2 including at least one slot, control resource sets in the slot also have same start locations and same duration, but a start location and duration of a control resource set in any slot in the slot group 1 are different from a start location and duration of a control resource set in any slot in the slot group 2. In other words, control resource sets are periodically distributed in one slot, and control resource sets in at least two slots have different start locations and/or different duration.

Figure 7:
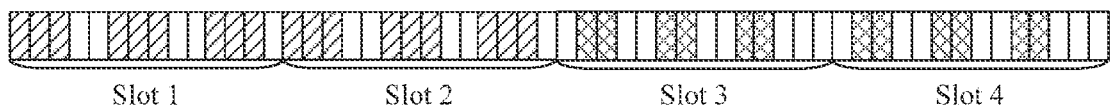
FIG. 7 is yet another schematic diagram of a control resource set configuration.

For ease of understanding, FIG. 7 is yet another schematic diagram of a control resource set configuration. As shown in FIG. 7, a start location of a control resource set in each of a slot 1 and a slot 2 is the zeroth symbol in the slot, a control resource set period is five symbols, and duration of the control resource set is three symbols; a start location of a control resource set in each of a slot 3 and a slot 4 is the first symbol in the slot, a control resource set period is four symbols, and duration of the control resource set is two symbols. Therefore, the slot 1 and the slot 2 constitute one slot group, and the slot 3 and the slot 4 constitute another slot group.

Optionally, the method 200 further includes step 230: The network device sends configuration information, where the configuration information is used to indicate a number of blind detection in each blind detection occasion.

Specifically, the configuration information may include at least one of the following: at least one downlink control information (DCI) format in each blind detection occasion, an aggregation level corresponding to each DCI format, a quantity of a plurality of candidate physical downlink control channels at a same aggregation level, a quantity N of the blind detection occasions in the first time unit, and the total number of blind detection in each blind detection occasion.

Correspondingly, in step 230, the terminal device receives the configuration information, where the configuration information is used to determine the number of blind detection in each blind detection occasion.

It should be noted that, downlink control information in different formats may occupy different quantities of CCEs, namely, may be corresponding to different aggregation levels. Further, each downlink control information format may be corresponding to at least one aggregation level. The network device may configure a quantity of candidate physical downlink control channels for each aggregation level. A set of candidate physical downlink control channels constitute a search space.

In a possible design, the terminal device may determine, based on the configuration information, the number, configured by the network device for the terminal device, of blind detection in each blind detection occasion. In this way, the terminal device can determine a format of downlink control information to be blindly detected and a blind detection occasion in which the downlink control information is to be blindly detected.

In another possible design, the terminal device may determine the number of blind detection in each blind detection occasion based on the maximum number of blind detection and the quantity N of the blind detection occasions in the first time unit. To be specific, the maximum number of blind detection is divided by the total quantity of the blind detection occasions. When the maximum number of blind detection is not divisible by the total quantity of the blind detection occasions, rounding up, rounding down, or rounding off may be performed.

In still another possible design, the terminal device may obtain the number of blind detection in each blind detection occasion based on the configuration information. In other words, the configuration information directly indicates the number of blind detection in each blind detection occasion.

In this embodiment of this application, numbers, configured by the network device for the terminal device, of blind detection in all blind detection occasions may be equal or unequal.

Still using FIG. 3 as an example, the first time unit includes four blind detection occasions, and the network device may configure a quantity of candidate physical downlink control channels for each aggregation level corresponding to each downlink control information format.

For example, aggregation levels corresponding to a downlink control information format of the physical downlink control channel 1 in FIG. 3 are aggregation levels 1 and 2, and there are six candidate physical downlink control channels at each of the aggregation levels 1 and 2; aggregation levels corresponding to a downlink control information format of the physical downlink control channel 2 are aggregation levels 4 and 8, and there are eight candidate physical downlink control channels at the aggregation level 4, and six candidate physical downlink control channels at the aggregation level 8.

In other words, equal allocation may be understood as that quantities, configured by the network device for one aggregation level of one downlink control information format, of candidate physical downlink control channels in any two blind detection occasions are the same. However, this does not indicate that actual number of blind detection performed by the terminal device in any two blind detection occasions for one aggregation level of one downlink control information format are the same.

In a case of equal allocation, the network device may indicate, in the configuration information, a quantity, configured for each blind detection occasion, of candidate physical downlink control channels at each aggregation level corresponding to each downlink control information format; or the network device may indicate, in the configuration information, a quantity of candidate physical downlink control channels at each aggregation level corresponding to each downlink control information format, and indicate, by using other signaling, that numbers of blind detection in the plurality of blind detection occasions are equally allocated. This is not limited in this application.

For another example, the network device may perform the following configuration: In the first blind detection occasion, a quantity of candidate physical downlink control channels for the physical downlink control channel 1 at the aggregation level 1 is 6, a quantity of candidate physical downlink control channels for the physical downlink control channel 1 at the aggregation level 2 is 6, a quantity of candidate physical downlink control channels for the physical downlink control channel 2 at the aggregation level 4 is 1, and a quantity of candidate physical downlink control channels for the physical downlink control channel 2 at the aggregation level 8 is 1; and in three remaining blind detection occasions, a quantity of candidate physical downlink control channels for the physical downlink control channel 2 at the aggregation level 4 is 8, and a quantity of candidate physical downlink control channels for the physical downlink control channel 2 at the aggregation level 8 is 6.

In other words, unequal allocation may be understood as that quantities, configured by the network device for one aggregation level of one downlink control information format (for example, the physical downlink control channel 2), of candidate physical downlink control channels in at least two blind detection occasions are different.

In a case of unequal allocation, the network device may indicate, in the configuration information, a quantity, configured for each blind detection occasion, of candidate physical downlink control channels at each aggregation level corresponding to each downlink control information format.

In this embodiment of this application, the physical downlink control channel blind detection configuration information may be indicated by using higher layer signaling (for example, a radio resource control (RRC) message).

Optionally, step 230 specifically includes:

sending, by the network device, the RRC message, where the RRC message carries the physical downlink control channel blind detection configuration information.

It should be understood that, the physical downlink control channel blind detection configuration information carrying in the RRC message is only a possible implementation.

Step 240: The terminal device performs physical downlink control channel blind detection in the $i^{th}$ (i is a positive integer, and i≤N) blind detection occasion.

Specifically, the terminal device may perform physical downlink control channel blind detection in a blind detection occasion of each physical downlink control channel based on the PDCCH blind detection configuration information that is obtained in advance (for example, received from the network device in step 230).

In this embodiment of this application, the network device may send the at least one physical downlink control channel in the N blind detection occasions according to a preset rule based on one or more items of the first information listed above. The terminal device may perform physical downlink control channel blind detection in each blind detection occasion according to the preset rule based on one or more items of the first information listed above.

As an example rather than a limitation, in step 220, the network device may send the at least one physical downlink control channel according to any one of or a combination of more than one of the following rules:

Rule 1: When a plurality of control resource sets are distributed in the $i^{th}$ blind detection occasion, an available control resource set is selected from the plurality of control resource sets based on a descending order of priorities of the plurality of control resource sets, and the at least one physical downlink control channel is sent by using the available control resource set.

For example, if a plurality of control resource sets are distributed in the $i^{th}$ blind detection occasion, the network device may select an available control resource set based on a descending order of priorities of the plurality of control resource sets, and send the one or more physical downlink control channels by using the available control resource set.

Rule 2: An available search space is selected from a plurality of search spaces in the $i^{th}$ blind detection occasion based on a priority order of search space types, and the at least one physical downlink control channel is sent by using the available search space.

For example, the search spaces include a common search space and a user-specific search space. If a priority of the common search space is higher than a priority of the user-specific search space, the one or more physical downlink control channels are sent by using the common search space firstly and then using the user-specific search space. Therefore, if the network device sends the one or more physical downlink control channels in the $i^{th}$ blind detection occasion, the one or more physical downlink control channels are preferentially sent by using the common search space.

Rule 3: When there are a plurality of downlink control information formats, the at least one physical downlink control channel is sent in the $i^{th}$ blind detection occasion based on a priority order of the downlink control information formats.

For example, if the network device sends physical downlink control channels in a plurality of downlink control information formats to a same terminal device, and the physical downlink control channels in the plurality of downlink control information formats are configured in the $i^{th}$ blind detection occasion, one or more physical downlink control channels may be sent in the $i^{th}$ blind detection occasion based on a priority order of the downlink control information formats.

Rule 4: A same downlink control information format is corresponding to a plurality of aggregation levels, and physical downlink control channel transmission is performed in the $i^{th}$ blind detection occasion based on a descending order or an ascending order of the aggregation levels.

For example, if a format of downlink control information sent by the network device in the $i^{th}$ blind detection occasion is corresponding to a plurality of aggregation levels, at least one available aggregation level may be selected based on a descending order of the aggregation levels, and the one or more physical downlink control channels are sent by using the at least one available aggregation level.

Rule 5: If there are a plurality of candidate physical downlink control channels at a same aggregation level, the at least one physical downlink control channel is sent in the $i^{th}$ blind detection occasion based on a descending order or an ascending order of serial numbers of start control channel elements (for example, CCE) of the plurality of candidate physical downlink control channels at the same aggregation level.

For example, if there are a plurality of candidate physical downlink control channels at a same aggregation level, the network device may select an available control channel element based on a descending order of serial numbers of start control channel elements of the plurality of candidate physical downlink control channels at the same aggregation level, and send the one or more physical downlink control channels by using the available control channel element.

The foregoing rules may be used in combination. Specific rules according to which the network device sends the physical downlink control channel are predefined, or specified in a protocol, or may be selected by the network device and notified to the terminal device by using signaling.

Correspondingly, in step 240, the terminal device may perform blind detection according to any one of or a combination of more than one of the following rules:

Rule 1: When a plurality of control resource sets are distributed in the $i^{th}$ blind detection occasion, physical downlink control channel blind detection is performed successively on the plurality of control resource sets based on a descending order of priorities of the plurality of control resource sets.

Rule 2: Physical downlink control channel blind detection is performed successively in a plurality of search spaces based on a priority order of search space types in the $i^{th}$ blind detection occasion.

For example, the search spaces include a common search space and a user-specific search space. If a priority of the common search space is higher than a priority of the user-specific search space, physical downlink control channel blind detection is performed successively in the plurality of search spaces in the $i^{th}$ blind detection occasion based on an order of first the common search space and then the user-specific search space.

Rule 3: When there are a plurality of downlink control information formats, physical downlink control channel blind detection is performed in the $i^{th}$ blind detection occasion based on a priority order of the downlink control information formats.

For example, if the network device sends physical downlink control channels in a plurality of downlink control information formats to a same terminal device, and the physical downlink control channels in the plurality of downlink control information formats are configured in the $i^{th}$ blind detection occasion, the physical downlink control channels in the plurality of downlink control information formats may be blindly detected successively based on a priority order of the downlink control information formats.

Rule 4: A same downlink control information format is corresponding to a plurality of aggregation levels, and physical downlink control channel blind detection is performed in the i$^{th}$ blind detection occasion based on a descending order or an ascending order of the aggregation levels.

Rule 5: If there are a plurality of candidate physical downlink control channels at a same aggregation level, physical downlink control channel blind detection is performed in the i$^{th}$ blind detection occasion based on a descending order or an ascending order of start CCE numbers of the plurality of candidate physical downlink control channels at the same aggregation level.

The foregoing rules may be used in combination. Specific rules according to which the terminal device performs physical downlink control channel blind detection are predefined, or specified in a protocol, or may be selected by the network device and notified to the terminal device by using signaling.

For example, the rule 1 and the rule 2 are used in combination.

Physical downlink control channel blind detection is preferentially performed on a control resource set (for example, a control resource set 1) with a higher priority in a blind detection occasion, and then physical downlink control channel blind detection is performed on a control resource set (for example, a control resource set 2) with a lower priority.

When the control resource set 1 includes a common search space and a user-specific search space, based on a priority order of the common search space and the user-specific search space, physical downlink control channel blind detection may be preferentially performed in a search space (for example, the user-specific search space) with a higher priority, and then physical downlink control channel blind detection is performed in a search space (for example, the common search space) with a lower priority.

A specific process of performing blind detection on the control resource set 2 is similar to a specific process of performing blind detection on the control resource set 1. For brevity, details are not described herein again.

For another example, the rule 3 and the rule 4 are used in combination.

When there are a plurality of downlink control information formats, for example, a downlink control information format A and a downlink control information format B, based on a priority order of the downlink control information formats, detection is first performed for a downlink control information format (for example, the downlink control information format A) with a higher priority, and then detection is performed for a downlink control information format (for example, the downlink control information format B) with a lower priority. Blind detection for the downlink control information format A is performed based on an aggregation level corresponding to the downlink control information format and a corresponding quantity of candidate physical downlink control channels.

If the downlink control information format A is corresponding to two aggregation levels, for example, an aggregation level 2 and an aggregation level 4, blind detection is performed based on a descending order of the aggregation levels. Therefore, blind detection is preferentially performed on a plurality of candidate physical downlink control channels at the aggregation level 4, and then blind detection is performed on a plurality of candidate physical downlink control channels at the aggregation level 2.

A specific process of detection for the downlink control information format B is similar to a specific process of detection for the downlink control information format A. For brevity, details are not described herein again.

For still another example, the rule 4 and the rule 5 are used in combination.

If a same downlink control information format is corresponding to at least two aggregation levels, for example, an aggregation level 4 and an aggregation level 8, blind detection is performed based on an ascending order of the aggregation levels. Therefore, blind detection is preferentially performed on a plurality of candidate physical downlink control channels at the aggregation level 4, and then blind detection is performed on a plurality of candidate physical downlink control channels at the aggregation level 8.

During blind detection on the plurality of candidate physical downlink control channels at the aggregation level 4, locations of the plurality of candidate physical downlink control channels may be first determined, namely, a serial number of a start CCE of each candidate physical downlink control channel is calculated; and then blind detection is performed successively on the plurality of candidate physical downlink control channels at the aggregation level 4 based on a descending order or an ascending order of serials number of the start CCEs of the plurality of candidate physical downlink control channels.

A specific process of performing blind detection on the plurality of candidate physical downlink control channels at the aggregation level 8 is similar to a specific process of performing blind detection on the plurality of candidate physical downlink control channels at the aggregation level 4. For brevity, details are not described herein again.

A plurality of blind detection rules and combinations of the plurality of rules are illustrated above, but this shall not constitute any limitation on this application. Physical downlink control channel blind detection performed by using any one of the foregoing rules shall fall within the protection scope claimed by this application.

The following describes, in detail with reference to specific examples, blind detection rules provided in this embodiment of this application.

In the following embodiments, it is assumed that the maximum number of blind detection in the first time unit is 44.

Embodiment 1

The physical downlink control channel 1 shown in FIG. 3 is used as an example. It is assumed that the network device sends only one physical downlink control channel, namely, the physical downlink control channel 1, in the first time unit. As described above, two aggregation levels, AL=1 and AL=2, are configured for the physical downlink control channel 1. It is assumed that a quantity of candidate physical downlink control channels corresponding to each of the two aggregation levels is 6. Therefore, the terminal device may successively perform physical downlink control channel blind detection based on an ascending order or a descending order of the aggregation levels according to the rule 4.

Because a number of blind detection of the terminal device in the blind detection occasion is 12, which does not reach the maximum number 44 of blind detection, blind detection is not limited by the maximum number of blind detection.

Embodiment 2

The physical downlink control channel 1 and the physical downlink control channel 2 shown in FIG. 3 are still used as an example. It is assumed that the network device sends two physical downlink control channels, namely, the physical downlink control channel 1 and the physical downlink control channel 2, in the first time unit. Physical downlink control channels in two downlink control information formats are configured for the first blind detection occasion, and a physical downlink control channel in only one downlink control information format is configured for the second to the fourth blind detection occasions. Therefore, the terminal device may perform physical downlink control channel blind detection in the first blind detection occasion based on the two downlink control information formats, and the terminal device may perform physical downlink control channel blind detection in the second to the fourth blind detection occasions based on the one downlink control information format.

It is assumed that numbers, configured by the network device for the terminal device, of blind detection in all blind detection occasions are equal. As described above, two aggregation levels, AL=1 and AL=2, are configured for the physical downlink control channel 1, and corresponding quantities of candidate physical downlink control channels are 6; and two aggregation levels, AL=4 and AL=8, are configured for the physical downlink control channel 2. It is assumed that a quantity of candidate physical downlink control channels at the aggregation level 4 is 8, and a quantity of candidate physical downlink control channels at the aggregation level 8 is 6.

In the first blind detection occasion, according to the rule 3 and the rule 4, the terminal device may first determine a downlink control information format for which blind detection is preferentially performed, and then perform blind detection based on aggregation levels corresponding to the downlink control information format for which blind detection is preferentially performed and a corresponding quantity of candidate physical downlink control channels. Assuming that the downlink control information format for which blind detection is preferentially performed is the physical downlink control channel 1, the terminal device first performs blind detection in the first blind detection occasion based on the aggregation level 1 and the aggregation level 2. Further, the terminal device may perform physical downlink control channel blind detection based on a priority order of the aggregation levels, for example, based on an ascending order of the aggregation levels. Therefore, preferentially based on the aggregation level 1, blind detection is performed on the six candidate physical downlink control channels at the aggregation level 1; and then based on the aggregation level 2, blind detection is performed on the six candidate physical downlink control channels at the aggregation level 2. Then, the terminal device performs blind detection for a downlink control information format of the physical downlink control channel 2. The terminal device can still perform physical downlink control channel blind detection based on an ascending order of the aggregation levels. In this case, first based on the aggregation level 4, the terminal device performs blind detection on the eight candidate physical downlink control channels at the aggregation level 4; and then based on the aggregation level 8, the terminal device performs blind detection on the six candidate physical downlink control channels at the aggregation level 8.

After detection in the first blind detection occasion, a number of blind detection of the terminal device reaches 26. Then, the terminal device performs physical downlink control channel blind detection in the second blind detection occasion. Because no physical downlink control channel 1 is configured in the second blind detection occasion, the terminal device needs to perform blind detection only on the physical downlink control channel 2. Therefore, blind detection can be directly performed on the eight candidate physical downlink control channels at the aggregation level 4 and the six candidate physical downlink control channels at the aggregation level 8.

After detection in the second blind detection occasion, a number of blind detection of the terminal device reaches 40, and only four times are left. Then, the terminal device performs physical downlink control channel blind detection in the third blind detection occasion. Because no physical downlink control channel 1 is configured in the third blind detection occasion, the terminal device needs to perform blind detection only on the physical downlink control channel 2. Because only four times of blind detection are left, blind detection cannot be performed separately on the eight candidate physical downlink control channels at the aggregation level 4 and the six candidate physical downlink control channels at the aggregation level 8. According to the rule described above, the terminal device performs physical downlink control channel blind detection based on an ascending order of the aggregation levels. Therefore, the terminal device preferentially performs blind detection on four candidate physical downlink control channels at the aggregation level 4.

Further, the four candidate physical downlink control channels may be selected according to the preset rule 5. For example, blind detection is performed on the first four candidate physical downlink control channels based on an ascending order of serial numbers of start control channel elements of the plurality of candidate physical downlink control channels.

It can be learned that, the rule 3, the rule 4, and the rule 5 are used in combination in a process of physical downlink control channel blind detection in Embodiment 2.

It should be understood that, in Embodiment 2, although the numbers, configured by the network device, of blind detection in all the blind detection occasions are equal, numbers of blind detection performed by the terminal device in any two blind detection occasions are not necessarily the same. This is because blind detection is limited by the maximum number of blind detection. Therefore, whether the numbers, configured by the network device, of blind detection in the plurality of blind detection occasions are equal does not necessarily determine whether actual numbers of blind detection performed by the terminal device in the plurality of blind detection occasions are equal.

In other words, numbers of physical downlink control channel blind detection in any two of the N blind detection occasions are the same; or numbers of physical downlink control channel blind detection in at least two of the N blind detection occasions are different.

Embodiment 3

The physical downlink control channel 1 and the physical downlink control channel 2 shown in FIG. 3 are still used as an example. It is assumed that the network device sends two physical downlink control channels, namely, the physical downlink control channel 1 and the physical downlink control channel 2, in the first time unit. Physical downlink control channels in two downlink control information formats are configured for the first blind detection occasion, and a physical downlink control channel in only one downlink control information format is configured for the second to the fourth blind detection occasions. Therefore, the terminal device may perform physical downlink control channel blind detection in the first blind detection occasion based on the two downlink control information formats, and the terminal device may perform physical downlink control channel blind detection in the second to the fourth blind detection occasions based on the one downlink control information format.

It is assumed that numbers, configured by the network device for the terminal device, of blind detection in all blind detection occasions are unequal. As described above, two aggregation levels, AL=1 and AL=2, are configured for the physical downlink control channel 1, and corresponding quantities of candidate physical downlink control channels are 6; and two aggregation levels, AL=4 and AL=8, are configured for the physical downlink control channel 2. The network device may perform the following configuration: A quantity of candidate physical downlink control channels corresponding to the first blind detection occasion or the last blind detection occasion or any blind detection occasion is 1, and quantities of candidate physical downlink control channels corresponding to other blind detection occasions are 5. Therefore, the maximum number 44 of blind detection is configured.

The terminal device may perform physical downlink control channel blind detection successively in the blind detection occasions according to rules illustrated above, such as the rule 3, the rule 4, and the rule 5 illustrated in Embodiment 2, based on the numbers, configured by the network device, of blind detection in all the blind detection occasions.

It should be understood that a specific process in which the terminal device performs physical downlink control channel blind detection according to the rule 3, the rule 4, and the rule 5 is similar to a specific process described in Embodiment 2. For brevity, detailed descriptions on the specific process are omitted herein.

It should be noted that, an unequal allocation method is particularly applicable to a case in which a maximum number X of blind detection is not divisible by the quantity N of the blind detection occasions, and a case in which a total quantity of candidate physical downlink control channels configured by the network device for the N blind detection occasions exceeds the maximum number X of blind detection.

It should be further understood that performing blind detection based on the ascending order of the aggregation levels, the ascending order of serial numbers of the start CCEs of the plurality of candidate physical downlink control channels, and the priorities of the downlink control information formats illustrated above with reference to Embodiments 1, 2, and 3 is merely used for example description, and shall not constitute any limitation on this application. For example, the terminal device may alternatively perform physical downlink control channel blind detection based on a descending order of the aggregation levels or a descending order of serial numbers of the start CCEs of the plurality of candidate physical downlink control channels. Priorities of the factors illustrated above are not specifically limited in this application.

It should be noted that, priorities of the factors in the first information illustrated above may be defined in a protocol, or may be indicated by the network device. This is not limited in this application.

It can be learned from the foregoing embodiments that, when the network device sends a plurality of physical downlink control channels to the terminal device, the terminal device does not need to perform blind detection separately based on different scheduling periods. The network device may select, according to one or more of the rules illustrated above, a resource used for sending a physical downlink control channel, and the terminal device may perform blind detection simultaneously on a plurality of different physical downlink control channels according to the one or more of the rules illustrated above, thereby preventing a detection omission of the terminal device. Further, a number of blind detection of the terminal device is limited by defining the maximum number of blind detection in the first time unit, thereby reducing blind detection complexity of the terminal device, and helping to reduce energy consumption caused by blind detection.

The foregoing describes in detail the communication method provided in the embodiments of this application, by using an example in which one slot is the first time unit. Actually, the first time unit is not limited to one slot, and may be alternatively a time length less than one slot, for example, k symbols. In this case, the first time unit does not necessarily include a plurality of blind detection occasions. In other words, the first time unit may include only one or even less than one blind detection occasion.

For example, the first time unit is three symbols, and one blind detection occasion is three symbols. In this case, the first time unit exactly includes one blind detection occasion. Alternatively, the first time unit is three symbols, and one blind detection occasion is five symbols. In this case, the first time unit includes less than one blind detection occasion.

In this case, the terminal device may determine a maximum number of blind detection in one blind detection occasion based on the maximum number of blind detection in the first time unit. For example, the maximum number of blind detection in the first time unit is X, the first time unit is k symbols, and one blind detection occasion includes d (d is a positive integer) symbols. Therefore, the maximum number of blind detection in the blind detection occasion is: $X/k*d$. When X is not divisible by $k*d$, rounding up, rounding down, or rounding off may be performed for $X/k*d$. This is not limited in this application.

Embodiment 4

Figure 8:
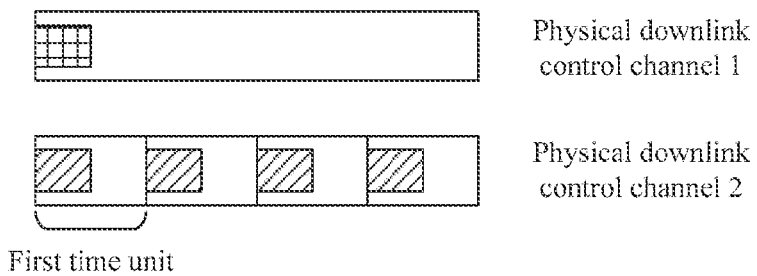
FIG. 8 is another schematic diagram of a blind detection period.

FIG. 8 is another schematic diagram of a blind detection period. FIG. 8 is a schematic diagram of sending physical downlink control channels in two downlink control information formats on a control resource set. A scheduling period of a physical downlink control channel 1 may be one slot, and a scheduling period of a physical downlink control channel 2 may be three symbols. It is assumed that the first time unit is also three symbols, and the maximum number of blind detection in the first time unit is 16.

Therefore, the terminal device may determine that a maximum number of blind detection in each blind detection occasion is 16/3*3=16.

It is assumed that physical downlink control channels in two downlink control information formats, namely, the physical downlink control channel 1 and the physical downlink control channel 2, are configured for the first blind detection occasion, and a physical downlink control channel in only one downlink control information format, namely, the physical downlink control channel 2, is configured for the second to the fourth blind detection occasions. Therefore, the terminal device may perform physical downlink control channel blind detection in the first blind detection occasion based on the two downlink control information formats, and the terminal device may perform physical downlink control channel blind detection in the second to the fourth blind detection occasions based on the one downlink control information format.

It is assumed that numbers, configured by the network device for the terminal device, of blind detection in all the blind detection occasions are equal. As described above, two aggregation levels, AL=1 and AL=2, are configured for the physical downlink control channel 1, and corresponding quantities of candidate physical downlink control channels are 6; and two aggregation levels, AL=4 and AL=8, are configured for the physical downlink control channel 2, a quantity of candidate physical downlink control channels corresponding to AL=4 is 8, and a quantity of candidate physical downlink control channels corresponding to AL=8 is 6.

According to the rule 3 and the rule 4, the terminal device may first determine a downlink control information format for which blind detection is preferentially performed, and then perform blind detection based on aggregation levels corresponding to the downlink control information format for which blind detection is preferentially performed and a corresponding quantity of candidate physical downlink control channels. Assuming that the downlink control information format for which blind detection is preferentially performed is the physical downlink control channel 1, the terminal device first performs blind detection in the first blind detection occasion based on the aggregation level 1 and the aggregation level 2. Further, the terminal device may perform physical downlink control channel blind detection based on a priority order of the aggregation levels, for example, based on an ascending order of the aggregation levels. Therefore, preferentially based on the aggregation level 1, blind detection is performed on the six candidate physical downlink control channels at the aggregation level 1; and then based on the aggregation level 2, blind detection is performed on the six candidate physical downlink control channels at the aggregation level 2. After blind detection on the physical downlink control channel 1, a number of blind detection of the terminal device reaches 12, and only four times are left. Therefore, blind detection cannot be performed for both the two aggregation levels of the physical downlink control channel 2.

The terminal device may perform, preferentially based on the aggregation level 4, blind detection on four candidate physical downlink control channels at the aggregation level 4 based on an ascending order of the aggregation levels according to the rule 4. The four candidate physical downlink control channels may be determined by the terminal device according to the rule 5.

A specific process in which the terminal device performs physical downlink control channel blind detection according to the rule 3, the rule 4, and the rule 5 is similar to a specific process described in the foregoing content with reference to Embodiment 2. For brevity, detailed descriptions on the specific process are omitted herein.

It should be understood that, the foregoing embodiment is described by assuming that the numbers, configured by the network device for the terminal device, of blind detection in all the blind detection occasions are equal, but this shall not constitute any limitation on this application.

It can be learned from the foregoing embodiment that, the first time unit is not limited to one slot, and may be alternatively k symbols less than one slot. Even if the first time unit includes only one blind detection occasion or a part of a blind detection occasion, the terminal device may deduce a maximum number of blind detection in one blind detection occasion based on the maximum number of blind detection in the first time unit. In addition, a definition of the first time unit is relatively flexible. Moreover, a number of blind detection of the terminal device in each blind detection occasion is limited, thereby reducing blind detection complexity of the terminal device, and helping to reduce energy consumption caused by blind detection.

The foregoing describes, in detail with reference to FIG. 2 to FIG. 8, the communication method provided in the embodiments of this application, and the following describes, in detail with reference to FIG. 9 to FIG. 12, a terminal device and a network device provided in embodiments of this application.

Figure 9:
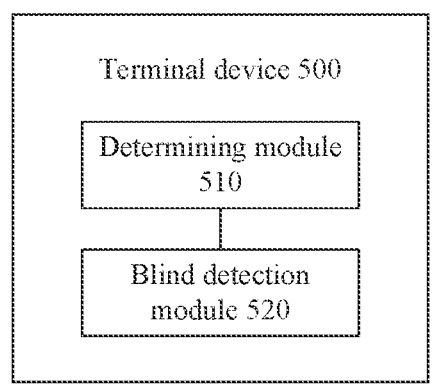
FIG. 9 is a schematic block diagram of a terminal device according to an embodiment of this application.

FIG. 9 is a schematic block diagram of a terminal device 500 according to an embodiment of this application. As shown in FIG. 9, the terminal device 500 includes a determining module 510 and a blind detection module 520.

The determining module 510 is configured to determine a maximum number of blind detection in a first time unit, where the first time unit is one or more symbols.

The blind detection module 520 is configured to perform physical downlink control channel blind detection in the $i^{th}$ blind detection occasion, where the first time unit includes N blind detection occasions, and a number of physical downlink control channel blind detection performed by the terminal device in the N blind detection occasions is less than or equal to the maximum number of blind detection.

i and N are positive integers, $i \leq N$, and $N \geq 2$.

Specifically, the terminal device 500 may be corresponding to the terminal device in the communication method 200 according to the embodiments of this application. The terminal device 500 may include modules configured to perform the method performed by the terminal device in the communication method 200 in FIG. 2. In addition, the modules in the terminal device 500 and the foregoing other operations and/or functions are separately used for implementing corresponding processes of the reference signal sending and receiving method 200 in FIG. 2. Specifically, the determining module 510 is configured to perform step 210 in the method 200, and the blind detection module 520 is configured to perform step 240 in the method 200. A specific process in which the modules perform the foregoing corresponding steps has been described in detail in the method 200. For brevity, details are not described herein again.

Figure 10:
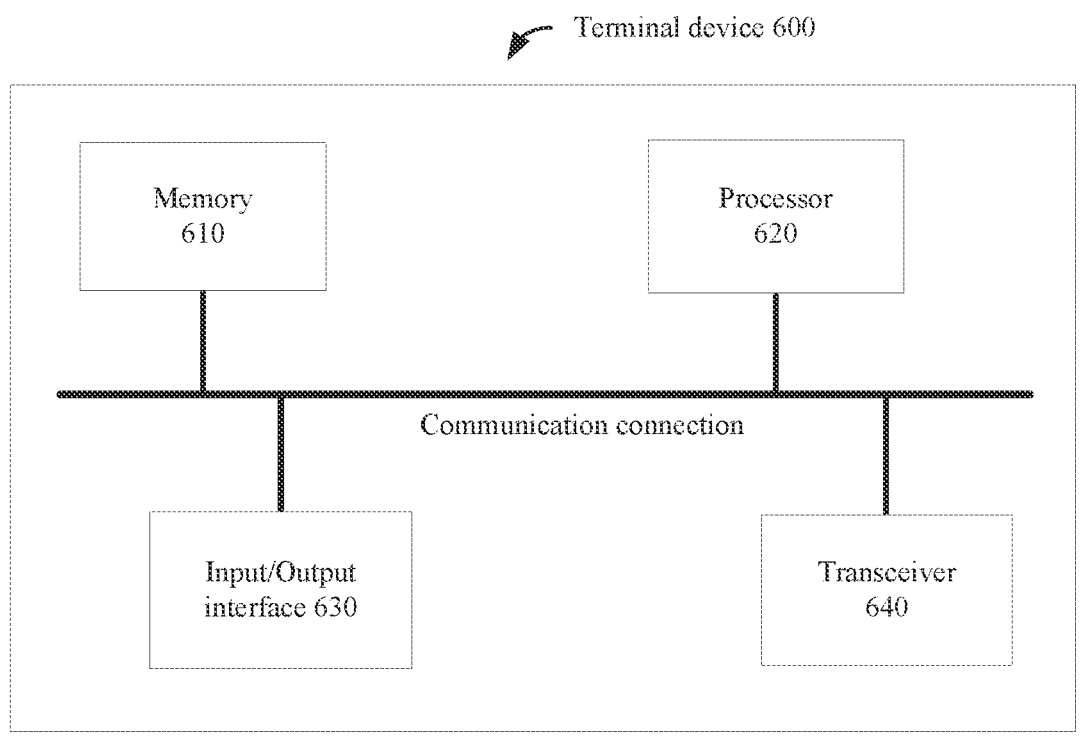
FIG. 10 is a schematic structural diagram of a terminal device according to an embodiment of this application.

FIG. 10 is a schematic structural diagram of a terminal device 600 according to an embodiment of this application. The terminal device 600 can perform all the methods in the foregoing embodiments. Therefore, for specific details of the terminal device 600, refer to descriptions in the foregoing embodiments. To avoid repetition, details are not described herein again. The terminal device 600 shown in FIG. 10 may include: a memory 610, a processor 620, an input/output interface 630, and a transceiver 640. The memory 610, the processor 620, the input/output interface 630, and the transceiver 640 are connected to each other through an inner connection path. The memory 610 is configured to store an instruction. The processor 620 is configured to execute the instruction stored in the memory 620, to control the input/output interface 630 to receive input data and information and to output data such as an operation result, and control the transceiver 640 to send a signal.

The processor 620 is configured to determine a maximum number of blind detection in a first time module, where the first time module is one or more symbols.

The processor 620 is further configured to perform physical downlink control channel blind detection in the $i^{th}$ blind detection occasion, where the first time module includes N blind detection occasions, and a number of physical downlink control channel blind detection performed by the terminal device in the N blind detection occasions is less than or equal to the maximum number of blind detection.

i and N are positive integers, i≤N, and N≥2.

Specifically, the terminal device 600 may be corresponding to the terminal device in the communication method 200 according to the embodiments of this application. The terminal device 600 may include modules configured to perform the method performed by the terminal device in the communication method 200 in FIG. 2. In addition, the modules in the terminal device 600 and the foregoing other operations and/or functions are separately used for implementing corresponding processes of the reference signal sending and receiving method 200 in FIG. 3. Specifically, the processor 620 is configured to perform step 210 to step 240 in the method 200, and the transceiver 640 is configured to perform step 2101 in the method 200. A specific process in which the modules perform the foregoing corresponding steps has been described in detail in the method 200. For brevity, details are not described herein again.

It should be understood that in this embodiment of this application, the processor 620 may be a general central processing unit (CPU), a microprocessor, an application-specific integrated circuit (ASIC), or one or more integrated circuits, configured to execute a related program, to implement the technical solutions provided in the embodiments of this application.

It should be further understood that, the transceiver 640 is also referred to as a communications interface, and is, for example but not limited to, a transceiver-type transceiver apparatus, to implement communication between the terminal device 600 and another device or a communications network.

The memory 610 may include a read-only memory and a random access memory, and provide an instruction and data to the processor 620. A part of the processor 620 may further include a non-volatile random access memory. For example, the processor 620 may further store information about a device type.

Figure 11:
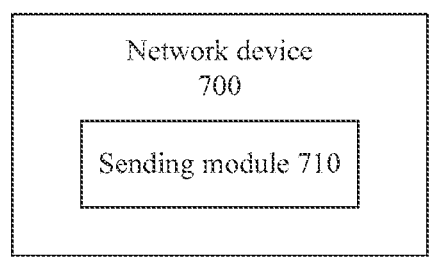
FIG. 11 is a schematic block diagram of a network device according to an embodiment of this application.

FIG. 11 is a schematic block diagram of a network device 700 according to an embodiment of this application. As shown in FIG. 11, the network device 700 includes a sending module 710.

The sending module 710 is configured to send configuration information, where the configuration information is used to determine a number of blind detection in each of N blind detection occasions in a first time unit, where the first time unit includes the N blind detection occasions.

The sending module 710 is further configured to send at least one physical downlink control channel in the $i^{th}$ blind detection occasion of the N blind detection occasions, where the first time unit is one or more symbols.

i and N are positive integers, i≤N, and N≥2.

Specifically, the network device 700 may be corresponding to the network device in the communication method 200 according to the embodiments of this application. The network device 700 may include modules configured to perform the method performed by the network device in the communication method 200 in FIG. 2. In addition, the modules in the network device 700 and the foregoing other operations and/or functions are separately used for implementing corresponding processes of the reference signal sending and receiving method 200 in FIG. 3. Specifically, the sending module 710 is configured to perform step 210, step 2101, step 220, and step 230 in the method 200. A specific process in which the modules perform the foregoing corresponding steps has been described in detail in the method 200. For brevity, details are not described herein again.

Figure 12:
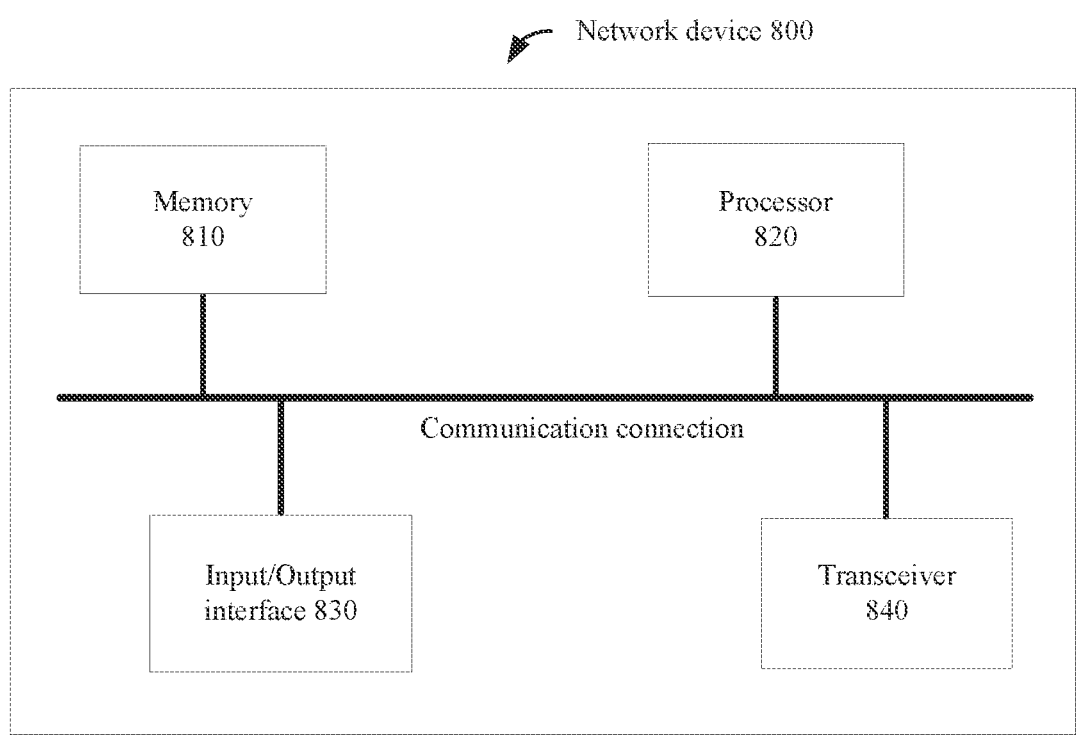
FIG. 12 is a schematic structural diagram of a network device according to an embodiment of this application.

FIG. 12 is a schematic structural diagram of a network device 800 according to an embodiment of this application. The network device 800 shown in FIG. 12 may include: a memory 810, a processor 820, an input/output interface 830, and a transceiver 840. The memory 810, the processor 820, the input/output interface 830, and the transceiver 840 are connected to each other through an inner connection path. The memory 810 is configured to store an instruction. The processor 820 is configured to execute the instruction stored in the memory 820, to control the input/output interface 830 to receive input data and information and to output data such as an operation result, and control the transceiver 840 to send a signal.

The transceiver 840 is configured to send configuration information, where the configuration information is used to determine a number of blind detection in each of N blind detection occasions in a first time unit, where the first time unit includes the N blind detection occasions.

The transceiver 840 is further configured to send at least one physical downlink control channel in the $i^{th}$ blind detection occasion of the N blind detection occasions, where the first time unit is one or more symbols.

i and N are positive integers, i≤N, and N≥2.

It should be understood that in this embodiment of this application, the processor 820 may be a general central processing unit (CPU), a microprocessor, an application-specific integrated circuit (ASIC), or one or more integrated circuits, configured to execute a related program, to implement the technical solutions provided in the embodiments of this application.

It should be further understood that, the transceiver 840 is also referred to as a communications interface, and is, for example but not limited to, a transceiver-type transceiver apparatus, to implement communication between the network device 800 and another device or a communications network.

The memory 810 may include a read-only memory and a random access memory, and provide an instruction and data to the processor 820. A part of the processor 820 may further include a non-volatile random access memory. For example, the processor 820 may further store information about a device type.

In an implementation process, steps in the foregoing method can be implemented by using a hardware integrated logic circuit in the processor, or by using an instruction in a form of software. The communication method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with the hardware of the processor. To avoid repetition, details are not described herein again.

It should be understood that, the processor in the embodiments of this application may be a central processing unit (CPU), or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

It should be understood that, the processor in the embodiments of this application may be a central processing unit (CPU), or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

It should be further understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) used as an external cache. By way of example but not limitative description, many forms of random access RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware, firmware, or any combination thereof. When software is used for implementation, the foregoing embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

It should be understood that sequence numbers of the foregoing processes do not mean execution sequences in various embodiments of this application. The execution sequences of the processes should be determined based on functions and internal logic of the processes, and shall not constitute any limitation on the implementation processes of the embodiments of this application.

Units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. Different methods may be used to implement the described functions for each particular application, but it should not be considered that such an implementation goes beyond the scope of this application.

For the purpose of ease and brevity of description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected depending on actual requirements, to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method for blind detection, comprising:
receiving, by a terminal device, configuration information from a network device;
determining, by the terminal device based on the configuration information, a configured total number of physical downlink control channel (PDCCH) candidates for blind detections in N blind detection occasions in a time unit, wherein the time unit comprises one or more symbols, and wherein N is a positive integer;
determining, by the terminal device, Q PDCCH candidates for blind detections in a search space with a low priority in the time unit according to the configured total number of PDCCH candidates for blind detections, P PDCCH candidates for blind detections in a search space with a high priority and a maximum number of PDCCH candidates for blind detections in the time unit, wherein $1 \leq P \leq M$, wherein $0 \leq Q \leq M-P$, wherein M represents the maximum number of PDCCH candidates for blind detections in the time unit, wherein M and P are positive integers, and wherein Q is an integer and is equal to or larger than zero; and
performing, by the terminal device, blind detections on the P PDCCH candidates in the search space with the high priority and on the Q PDCCH candidates in the search space with the low priority in the time unit;
wherein a total number of PDCCH candidates for blind detections performed by the terminal device within the time unit is less than or equal to the maximum number of PDCCH candidates for blind detections in the time unit.

2. The method according to claim 1, further comprising:
determining a number of blind detections in each blind detection occasion of the N blind detection occasions based on the configuration information.

3. The method according to claim 1, wherein performing the blind detections on the P PDCCH candidates in the search space with the high priority and on the Q PDCCH candidates in the search space with the low priority in the time unit is based on one or more of the following:
configuration information for a control resource set;
a format of downlink control information;
an aggregation level corresponding to the downlink control information; or
serial numbers of start control channel elements of a plurality of PDCCH candidates at a same aggregation level.

4. The method according to claim 3, wherein the blind detections on the P PDCCH candidates in the search space with the high priority and on the Q PDCCH candidates in the search space with the low priority in the time unit are based on the configuration information for the control resource set, and the control resource set does not span two slots.

5. The method according to claim 1, wherein the search space with the high priority comprises a common search space, and the search space with the low priority comprises a user equipment (UE)-specific search space.

6. The method according to claim 1, wherein the configured total number of PDCCH candidates for blind detections is larger than the maximum number of PDCCH candidates for blind detections.

7. The method according to claim 1, wherein the maximum number of PDCCH candidates for blind detections in the time unit is predefined.

8. The method according to claim 1, further comprising:
sending, by the terminal device, the maximum number of PDCCH candidates for blind detections in the time unit to the network device.

9. A communication apparatus, comprising:
a memory, configured to store computer executable program codes; and
a processor, configured to execute the program codes;
wherein the processor is configured to execute the program codes to facilitate the following being performed by the communication apparatus:
receiving configuration information from a network device;
determining, based on the configuration information, a configured total number of physical downlink control channel (PDCCH) candidates for blind detections in N blind detection occasions in a time unit, wherein the time unit comprises one or more symbols, and wherein N is a positive integer;
determining Q PDCCH candidates for blind detections in a search space with a low priority in the time unit according to the configured total number of PDCCH candidates for blind detections, P PDCCH candidates for blind detections in a search space with a high priority and a maximum number of PDCCH candidates for blind detections in the time unit, wherein $1 \leq P \leq M$, wherein $0 \leq Q \leq M-P$, wherein M represents the maximum number of PDCCH candidates for blind detections in the time unit, wherein M and P are positive integers, and wherein Q is an integer and is equal to or larger than zero; and
performing blind detections on the P PDCCH candidates in the search space with the high priority and on the Q PDCCH candidates in the search space with the low priority in the time unit;
wherein a total number of PDCCH candidates for blind detections for the PDCCH performed by the communication apparatus within the time unit is less than or equal to the maximum number of PDCCH candidates for blind detections in the time unit.

10. The communication apparatus according to claim 9, wherein the processor is further configured to execute the program codes to facilitate the following being performed by the communication apparatus:
determining a number of blind detections in each blind detection occasion of the N blind detection occasions based on the configuration information.

11. The communication apparatus according to claim 9, wherein performing the blind detections on the P PDCCH candidates in the search space with the high priority and on the Q PDCCH candidates in the search space with the low priority in the time unit is based on one or more of the following:
configuration information for a control resource set;
a format of downlink control information;
an aggregation level corresponding to the downlink control information; or serial numbers of start control channel elements of a plurality of PDCCH candidates at a same aggregation level.

12. The communication apparatus according to claim 11, wherein the blind detections on the P PDCCH candidates in the search space with the high priority and on the Q PDCCH candidates in the search space with the low priority in the time unit are based on the configuration information for the control resource set, and the control resource set does not span two slots.

13. The communication apparatus according to claim 9, wherein the search space with the high priority comprises a common search space, and the search space with the low priority comprises a user equipment (UE)-specific search space.

14. The communication apparatus according to claim 9, wherein the maximum number of PDCCH candidates for blind detections in the time unit is predefined.

15. The communication apparatus according claim 9, wherein the processor is further configured to execute the program codes to facilitate the following being performed by the communication apparatus:
sending the maximum number of PDCCH candidates for blind detections in the time unit to the network device.

16. A communication apparatus, comprising:
a memory, configured to store computer executable program codes; and
a processor, configured to execute the program codes;
wherein the processor is configured to execute the program codes to facilitate the following being performed by the communication apparatus:
sending configuration information to a terminal device, wherein the configuration information indicates a configured total number of physical downlink control channel (PDCCH) candidates for blind detections in N blind detection occasions in a time unit and a number of blind detections in each of the N blind detection occasions that the terminal device can perform, wherein the time unit comprises one or more symbols, wherein N is a positive integer, wherein the configuration information is usable to determine Q PDCCH candidates for blind detections in a search space with a low priority in the time unit, wherein 0≤Q≤M-P, wherein 1≤P≤M, wherein M represents a maximum number of PDCCH candidates for blind detections in the time unit, P represents a number of PDCCH candidates for blind detections in a search space with a high priority, wherein M and P are positive integers, and wherein Q is an integer and is equal to or larger than zero;
selecting an available search space out of the search space with the high priority or the search space with the low priority in an $i^{th}$ blind detection occasion of the N blind detection occasions, wherein i is a positive integer, and wherein 1≤i≤N; and
sending at least one PDCCH in the available search space.

17. The communication apparatus according to claim 16, wherein sending the at least one PDCCH in the available search space is based on one or more of the following:
configuration information for a control resource set;
a format of downlink control information;
an aggregation level corresponding to the downlink control information; or
serial numbers of start control channel elements of a plurality of PDCCH candidates at a same aggregation level.

18. The communication apparatus according to claim 17, wherein the control resource set does not span two slots.

19. The communication apparatus according to claim 16, wherein the search space with the high priority comprises a common search space, and the search space with the low priority comprises a user equipment (UE)-specific search space.

20. The communication apparatus according to claim 16, wherein the processor is further configured to execute the program codes to facilitate the following being performed by the communication apparatus:
sending first information to the terminal device, wherein the first information comprises at least one of the following:
configuration information for a control resource set;
a search space type;
a format of downlink control information;
an aggregation level corresponding to the downlink control information; or
serial numbers of start control channel elements of a plurality of PDCCH candidates at a same aggregation level.

* * * * *

UNITED STATES PATENT AND TRADEMARK OFFICE
CERTIFICATE OF CORRECTION

| | |
|---|---|
| PATENT NO. | : 11,483,094 B2 |
| APPLICATION NO. | : 16/810847 |
| DATED | : October 25, 2022 |
| INVENTOR(S) | : Ma et al. |

It is certified that error appears in the above-identified patent and that said Letters Patent is hereby corrected as shown below:

On the Title Page

(57) Abstract, Column 2, Line 1, cancel the text beginning with "This application provides a communication method, a ter-" to and ending "and N are positive integers, $i \leq N$ and $N \geq 2$." in Column 2, Line 17, and insert the following abstract:
-- Embodiments of this application provide a communication method, a terminal device, and a network device. Referring to the method, blind detection of a terminal device can be performed in different scheduling periods based on a maximum number of blind detection in a preset time period, thereby helping to reduce energy consumption that is caused to a terminal device by blind detection, and reduce blind detection complexity. --.

Page 2: Other Publications, Column 2, Line 37: "Generation Partnership Project, Valbonne, France (Aug. 25, 2017)." should read -- Generation Partnership Project, Valbonne, France (August 21st-25th, 2017). --.

Signed and Sealed this
Third Day of October, 2023

Katherine Kelly Vidal
*Director of the United States Patent and Trademark Office*